United States Patent [19]
Langer et al.

[11] Patent Number: 4,845,184
[45] Date of Patent: Jul. 4, 1989

[54] LIQUID CRYSTALLINE POLYESTERS

[75] Inventors: Matthew E. Langer, Guilderland; David N. Schissel, Clifton Park; Gary W. Yeager, Schenectady, all of N.Y.

[73] Assignee: General Electric Company, Schenectady, N.Y.

[21] Appl. No.: 212,633

[22] Filed: Jun. 28, 1988

[51] Int. Cl.$^4$ .............................................. C07C 69/76
[52] U.S. Cl. ..................................... 528/193; 528/176
[58] Field of Search ................................ 528/176, 193

[56] References Cited

U.S. PATENT DOCUMENTS

| | | | |
|---|---|---|---|
| 3,873,593 | 3/1975 | Heath et al. | 260/465 |
| 3,991,014 | 11/1976 | Kleinschuster | 260/47 |
| 4,265,802 | 5/1981 | Choe | 260/60 |

Primary Examiner—Harold D. Anderson
Assistant Examiner—T. Mason
Attorney, Agent, or Firm—William A. Teoli; James C. Davis, Jr.; William H. Pittman

[57] ABSTRACT

Liquid crystalline polyesters are provided having chemically combined 4,4'-bis(p-carboxyphenoxy)biphenyl, or 4,4'-bis(p-carboxyphenoxy)diphenylether units. These dicarboxyphenylether spacers can be obtained from the nitro displacement of alkyl nitrobenzene with the appropriate bisphenol.

4 Claims, No Drawings

LIQUID CRYSTALLINE POLYESTERS

BACKGROUND OF THE INVENTION

The present invention relates to liquid crystalline polyesters resulting from the use of 4,4'-bis(p-carboxyphenoxy)biphenyl or 4,4'-bis(p-carboxyphenoxy)diphenyl ether. These dicarboxyphenylethers which are obtained from the nitrodisplacement of alkyl nitrobenzoate with the appropriate biphenols can be used in the synthesis of several liquid crystalline polyesters.

Prior to the present invention, aromatic thermotropic liquid crystalline polymers had received considerable attention in the chemical literature as shown by "Polymeric Liquid Crystals", A. Blumstein, Ed. Plenum Press, New York (1985), and U.S. Pats. such as U.S. Pat. Nos. 4,522,974, 4,496,712, and 4,374,228. It was generally known that repeating units, such as 1,4-phenylene and 4,4'-biphenylene, impart valuable properties to polyesters, such as high tensile strength and heat and chemical resistance. However, many of these liquid crystalline polyesters have limited commercial utility, because their $T_m$'s are greater than 375° C. Various flexible spacers, such as methylene units, oxymethylene groups and siloxane groups have been used in the polymer backbone to reduce the melt temperature of the polymer.

The present invention is based on a discovery that a flexible spacer having the formula,

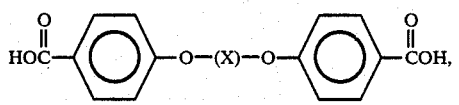
(1)

where X is selected from a $C_{(6-)}$ arylene radical or a $C_{(6-14)}$ aryleneoxyarylene radical, can be incorporated into a polyester backbone to form a polyester exhibiting anisotropic properties in the melt at temperatures in the range of from about 175° C. to 290° C.

STATEMENT OF THE INVENTION

There is provided by the present invention liquid crystalline polyesters capable of forming an anisotropic melt consisting essentially of, (i) 15 to 25 mole percent of dicarboxy bisphenyleter units of the formula,

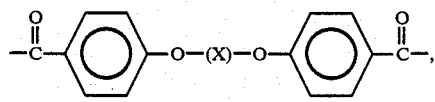
(2)

chemically combined with, (ii) 15 to 25 mole percent of bisoxyphenyl units of the formula,

(3)

(iii) 20 to 70 mole percent of oxyphenylcarboxy units of the formula,

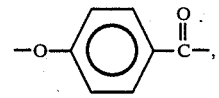
(4)

(iv) up to 25 mole percent of bisoxyphenyl ether units of the formula,

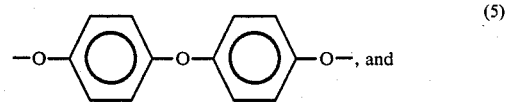
(5)

(v) up to 50 mole percent of bisoxyphenyl units of the formula,

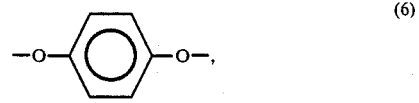
(6)

where X is as previously defined, and the mole percent of the respective units in the liquid crystalline polyesters is based on the total moles of chemically combined (i)-(v) units of the liquid crystalline polyester.

The biscarboxyphenyl ether compounds of formula (1) can be made by the procedure shown by Heath et al., U.S. Pat. No. 3,873,593, assigned to the same assignee as the present invention and incorporated herein by reference. For example, the reaction of disodium 4,4'-bisphenoxide or disodium 4,4'-oxybisphenoxide with two equivalents of ethyl-p-nitrobenzoate in dimethylsulfoxide can provide bis-(p-carboethoxyphenoxy)biphenyl or bis-(p-carboethoxy-phenoxy)biphenyl ether. Hydrolysis of the respective diesters with potassium hydroxide in refluxing methanol followed by acidification of the resulting dipotassium dicarboxylate with aqueous hydrochloric acid can provide the respective diacids.

A preferred procedure for making the liquid crystalline polyesters of the present invention, is by polymerization through transesterification of the dicarboxyphenyl ethers of formula (1) with the acetate species of the appropriate 1,4-phenylene ether, 4,4'-biphenylene ether, or 4,4'-phenyleneoxyphenylene ether, or hydroxybenzoic acid. Polymerization can be carried out in diphenyl ether. Although the liquid crystalline polyesters can be made in the melt without solvent, it was found that the addition of diphenyl ether facilitated the mixing which resulted in a more heterogeneous composition. The reaction was driven to completion by a continuous distillation of acetic acid followed by distillation of the diphenyl ether. The final stages of the reaction were run under high vacuum, such as 760 to 0.01 torr at elevated temperatures, for examples 180° to 400° C. to ensure complete removal of volatiles.

Liquid crystalline polyesters of the present invention have been found to be insoluble in methylene chloride, chloroform, toluene, 1,2-dichlorobenzene, and n-methylpyrrolidinone. They have been found to be only slightly soluble in boiling meta-cresol.

In order that those skilled in the art will be better able to practice the present invention, the following example is given by way of illustration and not by way of limitation. All parts are by weight.

EXAMPLE

A mixture of 2.86 grams (6.71 millimole) of 4,4'-bis(p-carboxyphenoxy)biphenyl, 3.61 grams (20.0 millimoles) of 4-acetoxybenzoic acid, 1.81 grams (6.70 millimoles) of 4,4'-diacetoxybiphenyl, and 8 ml about (50% by weight of the mixture) of diphenyl ether was heated to 250° C. for three hours while being continuously stirred under a nitrogen atmosphere. During the heating, acetic acid was continuously distilled off. After the removal of the acetic acid, the temperature of the mixture was raised to 325° C. and the diphenyl ether solvent was distilled off. The reaction mixture was cooled to room temperature and placed under high vacuum and heated to 280° C. for 20 minutes. The mixture was then allowed to cool to room temperature and the vacuum was released under nitrogen. There was obtained a polyester based on method of preparation. Polyester (A) was ground into small pieces and analyzed by DSC and hot stage polarized light microscopy.

Liquid crystalline polyester (B) was prepared by heating a mixture for 20 minutes with stirring under a nitrogen atmosphere consisting of 2.47 grams (5.58 millimoles) of bis-(p-carboxyphenoxy)biphenyl ether, 3.02 grams (16.7 millimoles) of 4-acetoxybenzoic acid, 1.51 grams (5.58 millimoles) of 4,4'-diacetoxybiphenyl, and 10 ml (about 60% by weight of the mixture) of diphenylether. Acetic acid was continuously distilled from the mixture as it was heated. After the complete removal of the acetic acid, the temperature of the mixture was raised to 290° C. to effect the distillation of the diphenyl ether solvent. The mixture was then cooled to room temperature and placed under high vacuum while it was heated to 340° C. for one hour. The mixture was then allowed to cool to room temperature and the vacuum was released under nitrogen. Based on method of preparation, there was obtained a polyester which was ground into small pieces and analyzed by DCS and hot stage polarized light microscopy.

Liquid crystalline polyester (C) was prepared by heating a mixture to 250° C. for two hours under nitrogen with continuous stirring consisting of 2.75 grams (6.45 millimoles) of bis-(p-carboxyphenoxy)biphenyl ether, 3.49 grams (19.4 millimoles) of 4-acetoxybenzoic acid, 1.38 grams (4.83 millimoles) of 4,4'-diacetoxybiphenyl ether, 0.31 grams (1.61 millimoles) of hydroquinone diacetate, and 8 ml (about 50% by weight of the mixture) of diphenyl ether. Acetic acid was continuously distilled from the mixture while it was heated. After the acetic acid removal was complete, the temperature of the mixture was raised to 350° C. to effect the removal of diphenyl ether by distillation. The mixture was then allowed to cool to room temperature and placed under high vacuum and heated to 240° C. for 30 minutes. The mixture was then allowed to cool to room temperature whereupon the vacuum was released under nitrogen. Based on method of preparation, a product was obtained which was a polyester. It was ground into small pieces and analyzed by DSC and hot stage polarized light microscopy.

In accordance with the above procedure, additional polyester (D) was prepared from 1.04 grams (2.44 millimoles) of bis(p-carboxyphenoxy)biphenyl ether, 1.32 grams (7.32 millimoles) of 4-acetoxybenzoic acid, 0.52 gram (1.83 millimoles) of 4,4'-diacetoxybiphenyl ether, 0.12 gram (0.61 millimole) of hydroquinone diacetate, and 7 ml (approximately 70% by weight) of diphenyl ether.

The differential scanning colorimetry data for the above polyesters (A)-(D) were as follows:

| Polyester | $T_g$ (°C.) | $T_m$ (°C.) |
| --- | --- | --- |
| (A) | 125 | 275 |
| (B) | 125 | 275 |
| (C) | 125 | 290 |
| (D) | 100 | 175 |

When examined optically through crossed polarizers, polyester (B) enters an anisotropic state at roughly 300° C. as evidenced by a birefringence in the melt. Polyesters (A) and (C) began to soften and become birefringent at roughly 300° C. It was found that polyester (D) was not liquid crystalline as it entered and isotropic melt at 175° C.

The above results show that polyesters (A)-(C) are liquid crystalline and allow for the production of solvent resistant and high strength structured thermoplastic materials.

Although the above example is directed to only a few of the very many polyesters which can be made in accordance with the practice of the present invention, it should be understood that the present invention is directed to a much broader variety of liquid crystalline polyesters and methods for making such materials as set forth in the description preceding this example.

What is claimed and sought to be protected by Letters Patent of the United States is as follows:

1. Liquid crystalline polyester capable of forming an anisotropic melt consisting essentially of, (i) 15 to 25 mole percent of dicarboxy bisphenylether units of the formula, chemically combined with a mixture of, (ii) 15 to 25 mole percent of bisoxybiphenyl units of the formula,

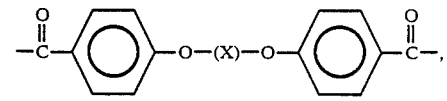

chemically combined with a mixture of, (ii) 15 to 25 mole percent of bisoxybiphenyl units of the formula,

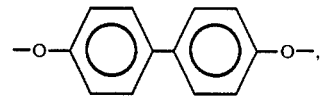

(iii) 20 to 70 mole percent of oxyphenylcarboxy units of the formula,

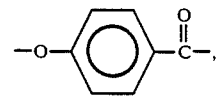

(iv) up to 25 mole percent of bisoxyphenyl ether units of the formula,

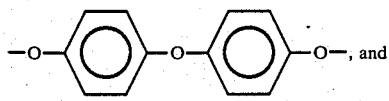, and (v) up to 50 mole percent of bisoxyphenyl units of the formula,

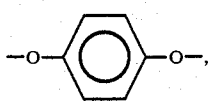, where X is a member selected from the class consisting of R and ROR, where R is a $C_{(6-14)}$ divalent arylene radical and the mole percent of the units in the liquid crystalline polyester is based on the total moles of the chemically combined units of (i)–(v) of said liquid crystalline polyester.

2. A liquid crystalline polyester in accordance with claim 1, having about 20 mole percent of bisoxyphenyl ether units.

3. A liquid crystalline polyester in accordance with claim 1, having about 20 mole percent of bisoxyphenyl ether units.

4. A liquid crystalline polyester in accordance with claim 1, where R is phenylene.

* * * * *